Patented Mar. 28, 1950

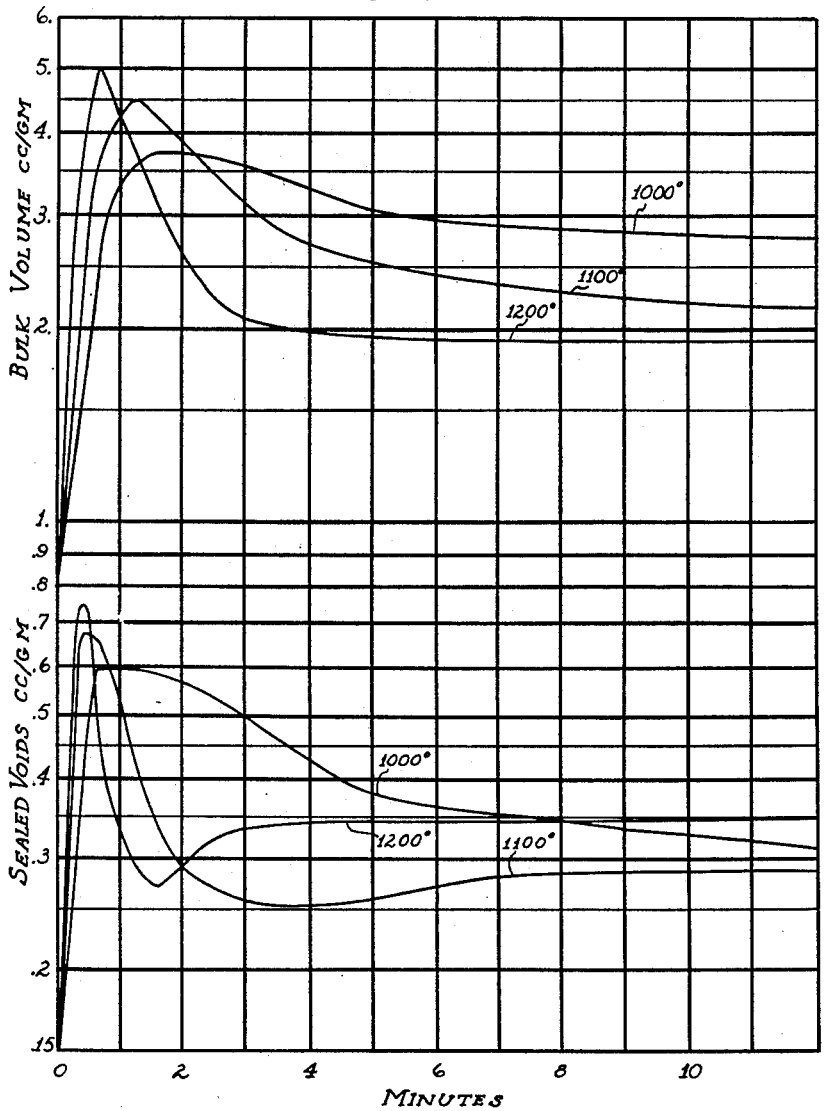

2,501,699

UNITED STATES PATENT OFFICE 2,501,699

THERMAL VESICULATION AND TREATING PROCESS FOR VOLCANIC GLASSES

Glenroy Stecker, Morton Grove, Ill., assignor to Great Lakes Carbon Corporation, Morton Grove, Ill., a corporation of Delaware Application June 5, 1947, Serial No. 752,818

4 Claims. (Cl. 252—378)

1

This invention relates to the heat treatment of perlitic minerals to produce vesiculated particles of high mechanical strength. More particularly it relates to a method for producing expanded perlite particles having a maximum strength coupled with a high proportion thereof in the form of sealed voids.

The raw material for this process comprises certain volcanic siliceous glasses generally containing approximately 2 to 6% water of constitution or bound water. The terms "perlite" or "perlitic mineral" are used herein to include any naturally occurring volcanic or eruptive glass in a substantially non-porous state containing water of constitution which are of equivalent behavior in the practice of this invention. Pumicite, although it is a secondary consolidated volcanic ash or tuff and certain varieties of pulverulent volcanic ash may also be included. These materials have the property when heated rapidly at elevated temperatures of expanding suddenly or "popping" into a light weight mass.

The perlitic mineral should contain water of constitution sufficient to expand the particles when heated under the proper controlled conditions. The natural minerals suitable for this reaction generally contain about 2% water or more and good results have been obtained from minerals containing 2–4.5% of bound water. Moisture adhering to the exterior of the particles is not considered as bound water or water of constitution. Unless specifically stated otherwise, whenever the term water is used in this application it refers to bound water.

Various perlitic minerals having varying contents of water expand to varying degrees depending in part upon the composition of the mineral and in part upon the conditions under which it is heated. A light weight aggregate ranging in bulk density from as little as 1.5 pounds per cubic foot upwardly and containing mono- and poly-cellular particles forming sealed voids may be produced when the mineral is heated. There is also present in the expanded mineral a varying proportion of "shatter" material, which appears to be composed of particles of cells or bubbles which have burst during formation or subsequent handling of the expanded material. The proportion of sealed void particles to shatter material varies depending upon the conditions under which the perlite is expanded. I have discovered that the proportion of sealed void particles to shatter material can be controlled by the proper correlation of time and temperature, and

2 that expanded materials of variously desired characteristics can be produced.

According to a broad embodiment, the present invention comprises expanding and vesiculating a perlitic mineral at a temperature and time correlated to produce a maximum vesiculation and thereafter heating the expanded mineral under particular conditions to increase the particle strength thereof without decreasing appreciably the number of sealed void particles.

In a more specific embodiment, the invention comprises vesiculating a perlitic mineral by heating at a temperature in the range of about 800°–1300° C. for a time of less than 4 minutes. The shorter time is used at the higher temperatures, and the longer time at the lower temperatures; said time and temperature are correlated to produce the maximum proportion of sealed void particles or bubbles and a relatively low proportion of shatter material therewith. The maximum of sealed void volume is that obtainable at the temperature used. After expanding and vesiculating, the mineral is heated further to increase the strength of the particle, the heating being continued until a substantially constant sealed void volume is reached but without increasing the proportionate amount of shatter material therein.

Figures 1 and 2 are semi-logarithmic plots of time of heating in minutes shown on the abscissa against bulk volume (Figure 2) and sealed void volume (Figure 1) respectively, in cubic centimeters per gram of expanded perlite. Referring to these figures it will be noted that the three corresponding curves of each were obtained by heating at three different temperatures. These results were obtained by placing a weighed sample of —20+40 mesh perlite in a silica boat and inserting the boat into a muffle furnace heated to a temperature just sufficiently above that desired to compensate for the cooling effect of the sample and container which drops the temperature to the desired value. The first up-rising part of the curves comprises a heating up period before the mineral begins to pop or expand. The samples were withdrawn from the furnace after the indicated periods of time and the bulk and sealed void volumes were determined.

The sealed void volume of a sample of expanded perlite is determined in a glass laboratory apparatus wherein the actual volume only of the particles of the sample is measured by their displacement of air when the pressure is reduced from atmospheric to approximately 0.5 of an atmosphere. This volume value includes that of solid material comprising fragments and broken bubbles or open cells as well as the volume of the closed cells and bubbles which comprise the sealed voids. The calculation of the sealed void volume per unit mass of sample is done by subtracting the specific volume of sample solids from the apparent specific volume of the particles found as described. The solids specific volume used is calculated from the particle density measurement of the crushed crude mineral which has been dehydrated by heating to 1000° C. slowly enough to avoid any expansion thereof.

The bulk volume of the expanded perlite is measured from the gravity settled volume of a sample poured through a funnel into a 25 cubic centimeter glass graduate.

The sealed void volume reaches a maximum at any of the three temperatures illustrated in less than 1 minute. This maximum varies according to the temperature used, being higher for the higher temperatures. At the higher temperature of expansion the sealed void volume rapidly decreases when the temperature is maintained for a longer time, until after about 3 to 5 minutes of heating, the curve indicating the decrease in void volume begins to flatten out.

In referring to Figure 1 it would be noted that at a time interval shortly after the perlite has reached its maximum sealed void volume, it reaches a maximum bulk volume. For the temperatures used, this maximum is reached in less than about 2 minutes. Comparing the times at which the maxima are reached, it will be observed that the sealed void volume maxima is reached first and that it begins to drop off rapidly in the case of the two higher temperatures shown while the bulk volume is still approaching its maximum value. At 1000° C. this effect is not so pronounced. The rapid decrease in sealed void volume and the rapid increase of bulk volume between the time the maximum is reached for the sealed void volume and the time it is reached for the bulk volume takes place because the particles, after having attained the maximum bubble formation, continue to expand and are burst resulting in formation of increased amounts of shatter material and a decreased amount of sealed void particles. Since it is desirable to preserve the maximum amount of sealed void particles in the finished material, it would seem undesirable to pass through the maximum point for bulk volume at the expense of the sealed voids. However, at the maximum void value, the particles are quite fragile and friable if heating is stopped at that point. As described in a co-pending application, Serial Number 752,817 filed concurrently herewith, the perlite can be expanded to produce a controlled void volume, and then annealed or tempered at a lower temperature to improve its strength without losing much in the way of sealed void volume.

The prevent invention provides for the production of expanded perlite having a substantial proportion of sealed void particles and at the same time a high particle strength and decreased tendency to shatter upon handling. Although the bulk volume and sealed voids are not as high as may be produced in the process of my co-pending application, the material produced by this invention is, nevertheless, of great value for certain purposes not requiring the highest bulk or sealed void volume. Loss of sealed voids can be avoided by the proper heat treatment of the expanded material providing this heat treatment is carried out before the destruction of sealed voids begins as described.

The present invention is concerned with the production of an expanded perlitic mineral which is heat treated in such a manner as to impart substantially different physical properties to the product to develop other utilities for certain purposes. According to the present invention, a perlitic mineral after it has fully attained its sealed void volume at a given temperature may be further heated at this temperature if initially low, or at a lower temperature when initially high and which may be again increased after a time, for a prolonged period of time, to secure other and new utilities for the product. This is in consequence of having reduced the sealed void volume without having appreciably reduced the number of sealed void particles present. Although the bulk volume may also be considerably reduced, conditions were found which permit controlling this change to be of a lesser extent than and be non-proportionate with the simultaneously occurring change in the sealed void volume. Further, under these conditions of profound secondary changes in the expanded perlite, I find that the product develops its greatest particle strength. This process, therefore, offers a method by which an expanded perlitic material can be produced having a maximum strength, a large proportion of sealed void particles compared with shatter material and a substantially greater bulk volume than the raw mineral from which it was made. At the same time the proportion of fragments or shatter material to voids is reduced. Thus, a −20+40 mesh (raw) perlite when expanded to a maximum value at any given temperature for an optimum time loses bulk volume upon being heated further. For example, when expanded at 1000° C., the material can be further heated at the same temperature to a total period of about 6–10 minutes at which time the bulk volume is reduced to approximately constant value while the particle strength of the material is greatly enhanced as was found by the lesser tendency to break into fragments upon being shaken in the presence of pebbles. At 1100° and 1200° C., continued heating after attaining maximum sealed void volume causes a substantial increase in the bulk volume due to the bursting into fragments of part of the sealed void particles. In order to avoid this, then as soon as the maximum sealed void volume at the given temperature is reached, the temperature will be dropped by about 50–200° C. and preferably to a point below 1000° C. but at which the thin walls of the hollow particles are still in a plastic semi-fused form. Under these conditions the pressure of generated water vapor, which is the principal cause of the expansion of perlitic minerals, may be reduced by diffusion from the bubbles and not by bursting them. The material can then be heated up to approximately the temperature at which it was popped and held at this point until the sealed void volume reaches approximately a constant value. Under these conditions, while the sealed void volume has decreased, the number of sealed void particles remains substantially constant. This is indicated by the fact that there is no more than about 5% of material produced which will be so fine as to pass a 40 mesh sieve after this treatment. This means that the proportion of sealed void particles to shatter material is high.

If the heating is stopped before the maximum sealed void volume is reached (that is, at a point on the left hand side of the three curves shown in Figure 1), the benefit observed herein is not so great. There is a greater tendency to lose sealed void volume and, furthermore, there remains a certain amount of material that has not been fully expanded. Hence, the bulk volume and sealed void volume of the heat treated material will be less than that which is produced when the material is first expanded to the maximum sealed void volume and is then heated under conditions to bring it to a constant value. It is, therefore, important in the matter of accurate control, that the conditions be selected to produce the maximum value for sealed void volume at any one operating condition but to control the heating under such conditions that the maximum bulk volume is not attained at the expense of sealed voids.

It will be observed from Figure 1 that at temperatures of 1100° C. the sealed void volume decreases as the heating is continued after the maximum value has been reached. The maximum bulk volume is then attained, partly at the expense of voids, and then bulk volume also decreases. Before the bulk volume reaches a more or less constant value, the sealed void volume reaches a low point and then begins to increase. This is a highly unexpected result. It does not seem to occur at temperatures below about 1050° C. The bulk volume begins to be asymptotic at about the time the sealed void volume comes to an approximately constant value. The heat treatment after the maximum void value (at temperatures of 1050–1300° C.) should therefore be continued until the void value has passed thru the minima and again risen to an approximate constant value. At this point maximum particle strength is acquired. Heating should then be stopped and the particles cooled. Long continued heating beyond 15–30 minutes results in a further loss, in void and bulk volume, especially at 1100–1300° C. The preferred heating time is correlated with the temperature between about 3 minutes and about 30 minutes and especially about 3 to about 20 minutes in the range of 1050–1300° C.

The initial stage of the heating conditions at temperatures of 1000° C. or higher are for a time of less than about 45 seconds and preferably less than 0.5 minute depending upon the type of apparatus and the rate at which the particle can be brought to the expanding temperature. The initial rising part of the curve shown will be displaced toward the left in apparatus where more rapid heating can be obtained. However, the same general relationship appears to hold at the higher temperature which can be attained very quickly. The time required may be a matter of a fraction of a second to a few seconds, for example 0.25 to 5 seconds. At temperatures below 1000° C., say 850–1000° C., time of approximately 0.5 to 4 minutes may be necessary to produce the maximum sealed void volume.

At these expansion conditions of less than 1000° C., the continued heating in the practice of this invention may be from 4 minutes upwardly when the temperature of heat treating is kept the same. However, it may be desirable in the case of the particles expanded at the lower temperature to keep the material at that temperature for a short time and then to raise the temperature above 1000° but below 1300° C. briefly. The number of sealed voids does not decrease under these conditions, but the particles become stronger.

When expansion temperatures above 1000° C. are used, the material is cooled to below about 1000° C. after being expanded and may be heated for a period of about 1–5 minutes at this temperature. The temperature is again increased up to about the initial popping temperature and held at this point until sealed void volume begins to approach a constant figure which requires about 1–5 minutes more. At this point the heat treatment may be discontinued.

The operating conditions selected will depend in part upon the size of the particles to be expanded. In general, higher temperatures and shorter times and more rapid heating is desirable for the smaller particle sizes. This also means that for the smaller particle sizes, the time for tempering or annealing the expanded particles should be comparatively short and it has been found particularly useful to resort to dropping the temperature rapidly after expansion has occurred and later raising it again, especially with the fine particles. Otherwise, they tend to fuse into droplets of more or less solid glass. The present invention is especially useful in connection with material of coarser mesh than about 60 and is particularly useful in those mesh ranges which are ordinarily employed for aggregates in concrete mixtures, plaster mixtures, and certain types of mixtures employing thermoplastic binders such as asphalt. The improved strength of high void particles according to this invention is of special utility to such bonded composites when the materials are to be used under exacting conditions requiring substantial mechanical strength or wearing properties such as flooring and in which the aggregate particles must be of high strength to carry a certain amount of load. Particles of adequate strength can be prepared which would yield aggregates which are less than half the weight of aggregates containing sand but which have comparable strength when made by this invention.

Products having high sealed void volumes are desirable especially when the expanded material is to be used in connection with various binders to produce concrete, plaster, building board, shingles, and other commercial articles. The sealed voids do not permit water or other liquid binder material to be absorbed into the mass of the expanded mineral and therefore make the material behave more like the massive aggregates heretofore used. The amount of water employed can thus be kept at the optimum, for example, in a given hydraulic cement.

The material containing the sealed voids imparts other desirable characteristics to the compositions. Because of the curved surfaces of the bubbles or cells, the particles have high mechanical strength and considerable resiliency which is imparted to the compositions in which they are used. This is not true of solid or crystalline aggregates. The sealed voids are evacuated, that is, the average pressure within the voids is less than atmospheric. This improves the insulating qualities of the material over a material having voids which are filled with gas. The advantage of using a material with a high sealed void content is illustrated in the case of a plaster mix made from two samples of expanded perlite having the same apparent bulk volume. The first sample with a sealed void volume of 0.60 cubic centimeter per gram was mixed in the proportion of 80 parts perlite to 20 parts plaster with sufficient water to make a mixture having the least cast volume. The second sample had a sealed void volume of 1.04 cubic centimeters per gram and a similar plaster mixture was made with it. The resulting volume of the first plaster composite was 65.5 cubic centimeters while the second specimen occupied a volume of 80 cubic centimeters. This shows definitely the advantages of using a product having a high sealed void volume.

Another advantage lies in the fact that the binder tends to coat over more completely the uniformly rounded surfaces of the sealed void particles; this permits for a maximum of continuous bonding between such particles. However, in the case of sealed void particles accompanied by large amounts of shatter material, continuity of the bond tends to diminish because of difficulty in coating all surfaces of the peculiarly irregular shaped curved surfaces of the shatter particles. As a consequence, mixtures employing the predominantly sealed void particle product of this invention have greater crushing strength than do those made from the high shatter-containing expanded perlite.

Perlite from deposits in Arizona was crushed to −20+40 mesh and expanded at a temperature of 1200° C. Referring now to Figures 1 and 2, after 5 minutes heating at 1200° C. the particles were stronger and less friable than particles produced by heating for 50 seconds, or another sample made by expanding for 10 seconds. The sealed void volume of each of the three samples was about the same. The sample at 10 seconds, however had a bulk volume of 1.5 (42 lb./cu. ft.) while the sample at 5 minutes was 1.9 (33 lb./cu. ft.). The sample at 50 seconds had a bulk volume of 4.5 (14 lb./cu. ft.). The sample at 5 minutes was strong, tough and resilient. The sample at 50 seconds was weak and friable. The sample at 10 seconds contained considerable unexpanded material and the expanded material was weak and friable compared with the 5 minute sample.

The invention should not be construed as limited to the exact conditions shown in the foregoing example.

I claim as my invention:

1. A process for expanding and vesiculating a perlitic mineral which comprises rapidly heating the comminuted mineral at a temperature of about 1050–1300° C. for a time of less than about 1 minute to produce a maximum vesiculation and thereafter immediately cooling said mineral by about 50° to about 200° C. to a point at which no further increase in bulk volume occurs, heating the mineral at this point for from 2 to 5 minutes and thereafter increasing the temperature to a point in the range of about 1000–1300° C., but not substantially higher than that of the original temperature of vesiculation and maintaining it at this point until the sealed void volume becomes substantially constant.

2. A process for expanding a naturally occurring volcanic glass which comprises rapidly heating the comminuted glass at a temperature of about 800–1300° C. for a time of less than about four minutes to produce maximum vesiculation and thereafter immediately cooling the expanded glass by about 50–200° C. to a point at which no further increase in bulk volume occurs, heating the mineral at this point for about two to about five minutes, and thereafter increasing the temperature to a point not substantially higher than that of the original temperature of vesiculation for about 1 to about 5 minutes to improve the strength of the particles.

3. A process for expanding and vesiculating a perlitic mineral which comprises rapidly heating the comminuted mineral at a temperature of about 800–1300° C. for a time of less than four minutes to produce maximum vesiculation, and thereafter cooling said mineral by about 50–200° C. to a point at which no further increase in bulk volume occurs, heating the mineral at this point for from two to five minutes, and thereafter increasing the temperature to a point no higher than that of the original temperature of vesiculation, and maintaining it at this point until the sealed void volume becomes substantially constant.

4. A process for expanding and vesiculating a perlitic mineral which comprises heating comminuted perlitic mineral to an expansion temperature of 800° to 1300° C. in a time of less than two minutes to produce a maximum of sealed void particles, cooling the particles by about 50° to about 200° C. below the expansion temperature, and thereafter heating the particles at a higher temperature not higher than that of the original vesiculation temperature, and maintaining it at this temperature until the sealed void volume is substantially constant.

GLENROY STECKER.

REFERENCES CITED

The following references are of record in the file of this patent:

UNITED STATES PATENTS

| Number | Name | Date |
| --- | --- | --- |
| 2,424,330 | Robertson | July 27, 1947 |

OTHER REFERENCES

Perlite, Bureau of Mines Publication IC 7364, 9 pages.